United States Patent [19]
Denis et al.

[11] Patent Number: 5,277,574
[45] Date of Patent: Jan. 11, 1994

[54] EQUIPMENT FOR THE MANUFACTURE OF POLYETHYLENE TEREPHTALATE CONTAINERS

[75] Inventors: Gerard Denis, Turretot; Paul La Barre, Sainte Adresse, both of France

[73] Assignee: Sidel, France

[21] Appl. No.: 868,734

[22] Filed: Apr. 15, 1992

Related U.S. Application Data

[62] Division of Ser. No. 654,701, Feb. 13, 1991, Pat. No. 5,229,042.

[30] Foreign Application Priority Data

Feb. 13, 1990 [FR] France .................. 90 01688

[51] Int. Cl.$^5$ .......................................... B29C 49/64
[52] U.S. Cl. ............................................. 425/526
[58] Field of Search ............ 425/526, 522, 525; 264/25, 346, 521, 529, 530, 535

[56] References Cited

U.S. PATENT DOCUMENTS

| | | | |
|---|---|---|---|
| 4,379,099 | 4/1983 | Ota et al. | 264/25 |
| 4,385,089 | 5/1983 | Bonnebat et al. | 264/529 X |
| 4,572,811 | 2/1986 | Ota et al. | 264/521 X |
| 4,836,971 | 6/1989 | Denis et al. | 264/530 X |
| 4,928,835 | 5/1990 | Collette et al. | 264/346 X |

FOREIGN PATENT DOCUMENTS

54-68384 6/1979 Japan ...................... 264/521
54-103474 8/1979 Japan ...................... 264/346

Primary Examiner—Richard L. Chiesa
Attorney, Agent, or Firm—Sughrue, Mion, Zinn, Macpeak & Seas

[57] ABSTRACT

Equipment for manufacturing a polyethylene terephthalate container which is capable of withstanding, without appreciable deformation, relatively severe thermal conditions encountered during processing by filling with a hot liquid or pasteurization of the contents of the container. The equipment includes a first mold which is designed to shape the body of an intermediate container from the body of an amorphous polyethylene terephthalate preform to a size larger than the dimensions of the final container to be obtained. Second, the equipment includes a treatment station which itself includes a first heating device which simultaneously heats the body and neck section of the intermediate container to a temperature of about 160° to about 240° C. to rapidly shrink the body of the intermediate container and to effect crystallization of the neck section and increase the crystallinity of the contracted intermediate container body. The treatment station then slowly cools the contracted intermediate container body and the neck section, whereafter a second heating device heats the contracted intermediate container prior to placing it in a second mold. The second mold has dimensions corresponding to the final size of the container to be obtained.

10 Claims, 6 Drawing Sheets

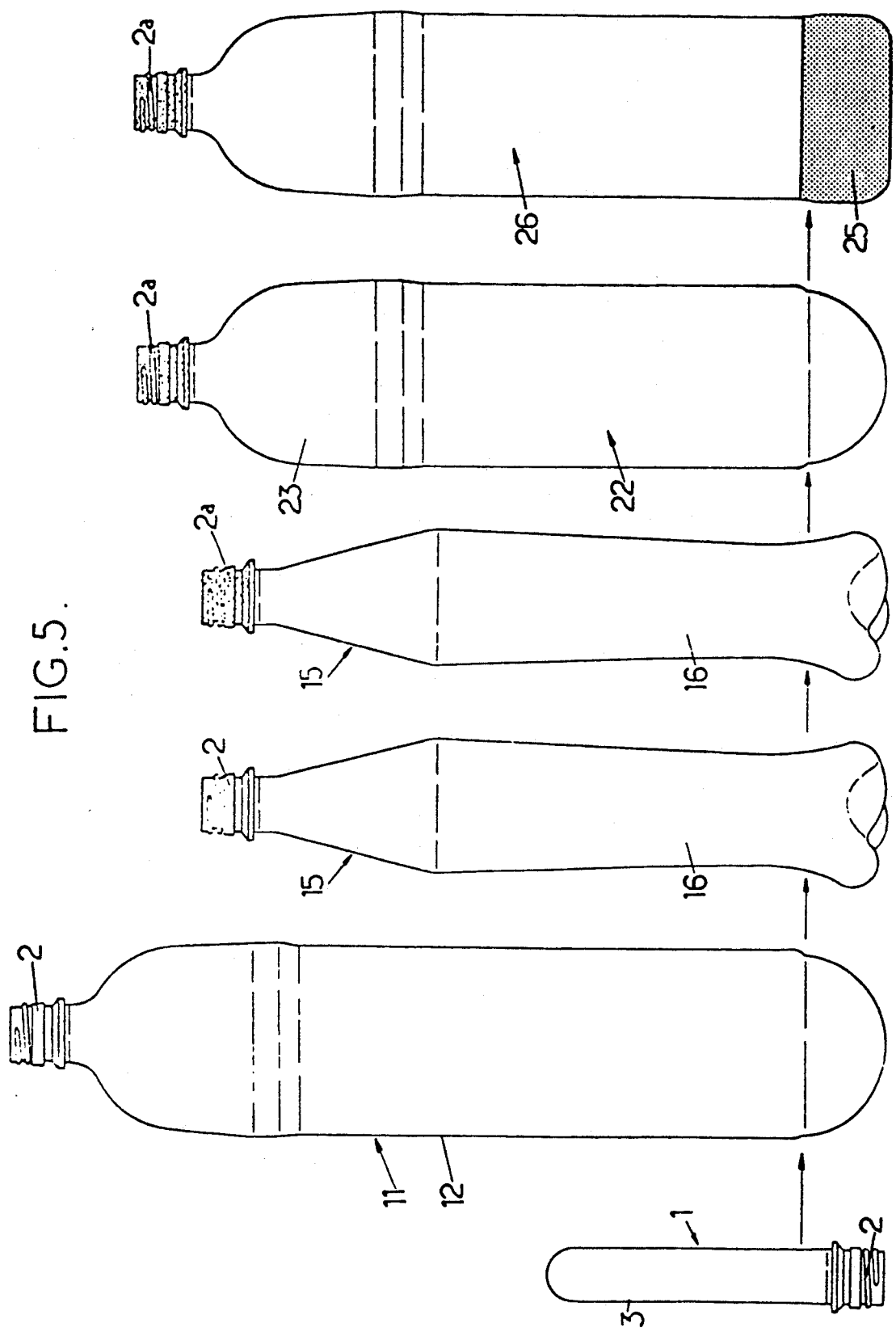

EQUIPMENT FOR THE MANUFACTURE OF POLYETHYLENE TEREPHTALATE CONTAINERS

This is a divisional of application Ser. No. 07/654,701 filed Feb. 13, 1991, now U.S. Pat. No. 5,229,042.

FIELD OF THE INVENTION

The present invention relates to a process and related equipment for the manufacture of containers made from polyethylene terephthalate (PET), which can withstand without undue deformation relatively severe thermal conditions encountered during processes such as filling with a hot liquid and pasteurization of the contents of the container.

BACKGROUND OF THE INVENTION

French Patent No. 2 595 294 discloses a process and an equipment installation allowing manufacture of containers, and especially bottles, which thoroughly comply with the imposed requirements and which can withstand, without marked deformations, filling with a hot liquid (temperatures above 80° C.), for example, or a pasteurization operation.

However, experience has shown that it is desirable to reduce to a minimum the number of container-treatment stations during manufacture and/or to simplify the structure of the container, thereby favorably affecting not only the overall cost of the equipment, for example, reduction in purchase price, transport costs, maintenance costs, and risks of breakdown, but also the manufacturing time for each container.

SUMMARY OF THE INVENTION

The present invention is, therefore, directed to a new process and equipment installation allowing these requirements to be met, while at the same time conserving the two consecutive stretching-molding steps implemented in accordance with French Patent 2 595 294, which impart to the containers the desired capacity to withstand relatively severe thermal conditions.

More specifically, this invention relates to a process and equipment installation for the manufacture of PET containers, such as bottles, which are resistant to relatively severe thermal conditions during use, such as filling with a hot liquid or pasteurization of the contents.

These and other objects and advantages of the present invention are accomplished by a process for the manufacture of a polyethylene terephthalate (PET) container capable of withstanding, without appreciable deformation, relatively severe thermal conditions encountered during processing by filling with a hot liquid or pasteurization of the contents of the container, comprising in succession:

a) heating only the body, exclusive of the neck section, of an amorphous PET preform to a temperature at least equal to the PET-softening temperature, wherein the neck section of the preform already possesses the final shape and dimensions of the PET container to be formed;

b) blow molding the heated preform body to form an intermediate container whose body has dimensions greater, by about 20% with respect to height and by 0 to about 30% transversely, than the dimensions of the final container to be formed, while cooling the mold walls holding the intermediate container to a temperature of about 5° to about 40° C.;

c) heating the body of the intermediate container to a temperature of about 160° to about 240° C. for a period of about 1 to about 5 minutes, while heating the neck section during part of or the entire body heating time under temperature and time conditions sufficient to allow crystallization of the PET neck section alone;

d) slowly cooling the neck section; and e) blow molding the heated contracted body of the intermediate container obtained at the end of step d) to its final shape and dimensions for a period of about 2 to about 6 seconds.

In addition, the present invention also relates to equipment for manufacturing a PET container capable of withstanding, without appreciable deformation, relatively severe thermal conditions encountered during processing by filling with a hot liquid or pasteurization of the contents of the container, comprising:

a) a first heating device for heating, to a temperature at least equal to the PET-softening temperature, only the body, exclusive of the neck section, of an amorphous PET preform wherein the neck section of the preform already possesses the final shape and dimensions of the PET container to be formed, and wherein the device is adapted so as to provide thermal protection for the neck section, in order to prevent it from being heated;

b) a first mold designed to shape the body of an intermediate container from the body of the preform, wherein the first mold has a molding cavity whose dimensions are larger than the dimensions of the final container to be obtained by about 20% with respect to height and from 0 to about 30% transversely, and is equipped with means for cooling the walls of the cavity to a temperature of about 5° to about 40° C.;

c) a treatment station comprising a second heating device designed to heat the body of the intermediate container to about 160° to about 240° C. and to heat the neck, during part of or the entire body heating time, under temperature and time conditions to ensure crystallization of the PET neck section only, and means for slowly cooling the neck section; and d) a second mold designed to shape the body of the final container from the heated body of the intermediate container, wherein the second mold has a molding cavity with dimensions that match the body of the final container and is fitted with means enabling the walls of the cavity to be kept at a selected temperature.

BRIEF DESCRIPTION OF THE DRAWINGS

FIG. 5 represents one bottle produced in accordance with the invention in different stages of manufacture where these stages correspond to the equipment stations shown in FIGS. 1A and 1B.

DETAILED DESCRIPTION OF THE PREFERRED EMBODIMENTS

Figure 1A:
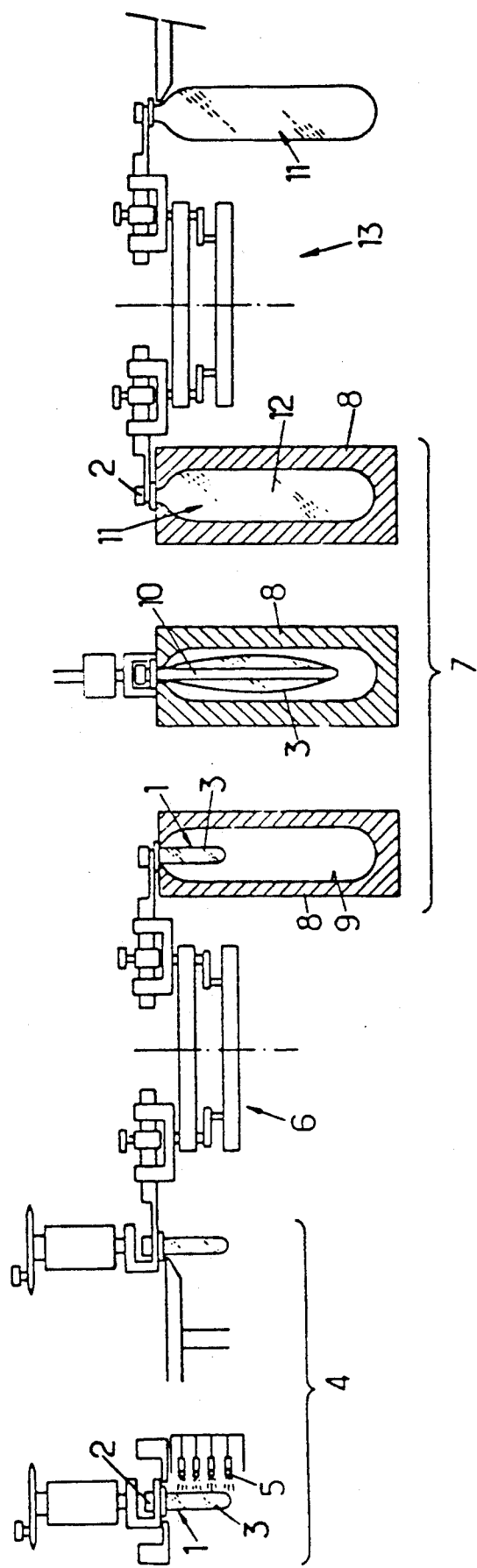
FIGS. 1A and 1B are schematic illustrations successively representing the different stations of an equipment installation according to the invention.
Figure 1B:
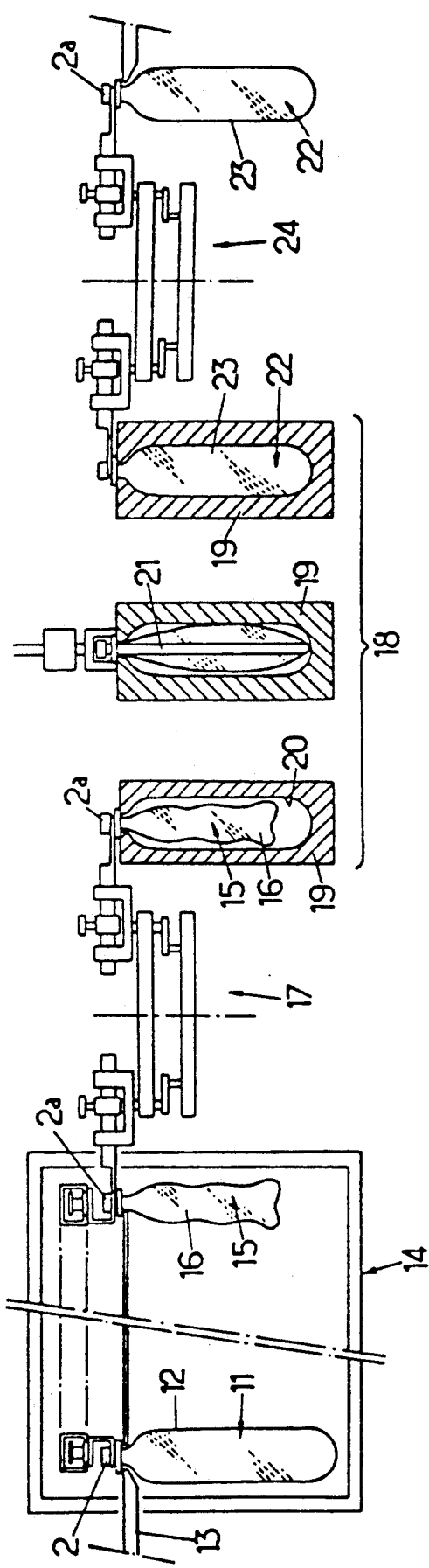

In one aspect, the present invention, with reference to one particular embodiment thereof depicted by the drawing numerals, relates to a process for the manufacture of a polyethylene terephthalate (PET) container capable of withstanding, without appreciable deformation, relatively severe thermal conditions encountered during processing by filling with a hot liquid or pasteurization comprising in succession:

a) heating (at 4) only the body (3), exclusive of the neck section (2), of an amorphous PET preform (1) to a temperature at least equal to the PET-softening temperature, wherein the neck section (2) of the preform already possesses the final shape and dimensions of the PET container to be formed;

b) blow molding (at 7) the heated preform body (3) to form an intermediate container (11) whose body (12) has dimensions greater, by about 20% with respect to height and by 0 to about 30% transversely, than the dimensions of the final container to be formed, while cooling the mold walls holding the intermediate container to a temperature of about 5° to about 40° C.;

c) heating (at 14) the body (12) of the intermediate container (11) to a temperature of about 160° to about 240° C. for a period of about 1 to about 5 minutes, while heating the neck section (2) during part of or the entire body (12) heating time under temperature and time conditions sufficient to allow crystallization of the PET neck section alone;

d) slowly cooling the neck section (2a); and e) blow molding the heated contracted body (16) of the intermediate container (15) obtained at the end of step d) (at 18) to its final shape and dimensions for a period of about 2 to about 6 seconds.

Thus, according to the process of the present invention, a preliminary separate step involving shaping of the crystallized neck, which was required in the procedure according to French Patent No. 2 595 294, is eliminated. In the present invention, this step is incorporated into step (c) involving heating of the intermediate container, which is carried out between the two consecutive stretching-blow molding steps performed on the container body. This integration of the two steps, which both involve heating, produces economically advantageous consequences for the structure of the equipment installation, which will be explained more fully below.

In addition, the integration of these two heating steps also results in a proportionate reduction (approximately 30 to 60 seconds) of the manufacturing time for each container.

In a first embodiment of steps c) and d) of the above-described process, only the body of the intermediate container is heated, while the neck is not heated. Next, the neck is heated at the same time the body is heated. Finally, the neck alone is slowly cooled while the heating of the body alone continues until completion. The preliminary heating of the body alone of the intermediate container is advantageously performed for about 3 to about 30 seconds, and preferably about 5 seconds.

In a second embodiment of steps c) and d) of this process, the entire intermediate container, both body and neck, is heated simultaneously, then the neck only is slowly cooled while the heating of the body alone is continued and completed.

In both of these embodiments, cooling of the neck alone advantageously comprises a stabilization step at an ambient (heating device or oven) temperature of about 50° to about 100° C. for about 5 to about 30 seconds, preferably about 20 seconds. Next, actual cooling using lower temperatures is conducted for about 20 to about 40 seconds, preferably 25 seconds.

In a third embodiment of steps c) and d) of this process, the entire intermediate container, both body and neck, is heated. Next, the entire container thus obtained, both body and neck, is cooled simultaneously. Finally, the body is reheated prior to step e). The heating can be carried out by heating the body alone, while protecting the neck as required, or by heating the entire container, both body and neck, using infrared radiation for a short period. In this situation, the heating time is not long enough to allow pronounced heating of the thick wall of the neck, and therefore only the thin wall of the body is substantially heated. To achieve this, final heating of the body prior to implementation of step e) is performed for a period of about 3 to about 20 seconds, preferably about 5 seconds. Advantages are also gained when the simultaneous cooling of the entire container, both body and neck, is for a period of about 10 to about 60 seconds, preferably about 40 seconds.

In all of the above cases, the simultaneous heating of the entire container, body and neck, during step c) is preferably carried out for a period of about 30 to about 90 seconds, most preferably about 45 seconds.

According to another aspect of the invention, the equipment installation for manufacturing a PET container comprises, with reference to the drawing numerals:

a) a first heating device (4) used to heat, to a temperature at least equal to the PET-softening temperature, only the body (3) exclusive of the neck section (2) of an amorphous PET preform (1) wherein the neck section of the preform already possesses the final shape and dimensions of the PET container to be formed and wherein the device is adapted so as to provide thermal protection for the neck section (2), in order to prevent it from being heated;

b) a first mold (8) designed to shape the body of an intermediate container (11) from the body (3) of the preform (1), wherein the first mold has a molding cavity (9) whose dimensions are larger than the dimensions of the final container to be obtained by about 20% with respect to height and by 0 to about 30% transversely and being equipped with means for cooling the walls of the cavity to a temperature of about 5° to about 40° C.;

c) a treatment station (14) comprising a second heating device (27) designed to heat the body (12) of the intermediate container (11) to about 160° to about 240° C. and to heat the neck, during part of or the entire body heating time, under temperature and time conditions to ensure crystallization of the PET neck section only, and, means for slowly cooling the neck section (2a); and d) a second mold (19) designed to shape the body of the final container from the heated body (16) of the intermediate container (15), wherein the second mold has a molding cavity (20) with dimensions that match the body of the final container and being fitted with means enabling the walls of the cavity to be kept at a selected temperature.

Because of the structure of this equipment, an initial heating device designed for the crystallization of the neck alone, which was called for in the installation in French Patent 2 595 294, can be eliminated. The elimination of this heating device, of the associated conveyors, and of all the corresponding attached equipment makes the installation less costly when purchased, more compact, less subject to operational breakdowns, less costly to maintain, and easier and less expensive to transport.

Furthermore, the concomitant reduction of the time required for manufacture of each container allows accelerated fabrication on an industrial scale.

In a first embodiment of the equipment installation, the second heating device is structured so as to first heat only the body of the intermediate container, while the neck is not heated, then to heat the entire container, both body and neck, and, finally, to continue and complete heating of the body alone while the neck is cooled.

In a second embodiment, the second heating device is structured in order to heat the entire intermediate container, both body and neck, and then to continue and complete heating of the body only, while the neck is cooled.

In a third embodiment, the second heating device is structured to allow heating of the entire intermediate container, both body and neck; the cooling means are structured to allow cooling of the entire container, both body and neck. A third heating device is designed to heat the body of the intermediate container before this body is placed into the second mold.

In the third embodiment, the third heating device may be designed so that only the body of the container is heated, or as an additional embodiment, the third heating device may be designed so as to heat the entire container, both body and neck, and to equip it with heating elements which emit infrared radiation, whereby only the body is substantially heated because of the arrangement.

With reference to the drawings, preferred embodiments of the present invention are described below. The invention may be implemented by beginning with a bottle preform (1) produced, in a conventional manner, by a molding operation involving the injection of polyethylene terephthalate (PET). In this initial stage, the PET is amorphous and the entire preform (neck (2) and body (3)) is transparent (see FIG. 5). The preform is molded with a neck (2) having the exact shape and dimensions of the final PET container to be formed but whose mechanical properties are not definitively established because of the amorphous nature of the PET.

With reference, first, to FIGS. 1A and 5, the preforms (1) taken from stock (not shown) are positioned and transported by means of a conveyor device (not shown) to a first heating station (4) comprising a succession of infrared ovens (5) arranged as a corridor or tunnel, within which the preforms are transported, while the necks (2), made of amorphous PET, of the preforms are thermally protected during this operation. The heating temperature is at least 70°-72° C. (PET vitreous transition temperature, referred to herein as the "PET-softening" temperature), preferably about 100° to about 120° C., for about 25 seconds.

The preforms whose bodies are heated are then transported by a conveyor (6) to a first blow molding station (7). Individual molds are advantageously arranged in the shape of a carrousel The heated body (3) of the preform is placed in a mold (8) whose cavity (9) has dimensions larger than those of the final container to be produced by about 20% with respect to height and by 0 to about 30% transversely.

Molding takes place by inserting a movable mandrel (10) inside the preform (1) so as to axially elongate the body (3) of the preform until it reaches the bottom of the mold (9). A pressurized fluid, for example, compressed air, is injected into the elongated body, which step may be preceded by an optional preliminary blowing operation under about 10 bars so as to place the film of material under tension. Then, blow molding is performed under about 15 to about 40 bars pressure in order to expand the body and to press it against the walls of the cavity (9). The entire cycle lasts about 2 to about 10 seconds. During this blow molding operation, the walls of the mold are cooled using air or water, so that the temperature remains between about 5° and about 40° C., preferably between about 10° and about 15° C.

An intermediate container (11) still having the same neck (2) made of amorphous PET and a biaxially-stretched body (12) having dimensions noticeably greater than those of the final container to be produced by about 20% with respect to height and by about 0 to about 30% transversely emerges from the first molding station (7). The intermediate container (11) is transported by a conveyor (13) to a treatment station (14) comprising a second heating station in which the entire intermediate container (11) (neck and body) is subjected to a temperature of about 160° to about 240° C. for a period of about 1 to about 5 minutes, preferably about 200° C. for about 1.5 minutes. In this same treatment station (14), the heated neck then undergoes controlled cooling under conditions allowing the completion of the crystallization of the PET in the neck section alone. The layout and operation of the treatment station (14) will be explained later in more detail with respect to FIGS. 2 to 4.

Upon exiting the treatment station (14), the heated body (16) of the container (15) (see FIG. 5) is noticeably deformed and retracted or shrunken in size, while its cold neck (2a) is crystallized. The container in this condition is transported by a conveyor (17) to a second molding station (18). The individual molds are advantageously arranged in carrousel fashion. The body (16) of the container (15) is inserted in a mold (19) whose cavity (20) has the shape and dimensions of the body of the final container to be produced.

The same molding procedure as above is carried out. A mandrel (21) is inserted in the body (16) and shifted so as to lengthen the body axially and to center it on the bottom of the mold (20). Compressed air under about 30 to about 40 bars pressure is injected so as to expand the body (16) and to make it mold to the shape of the cavity (20). During this time, the mold is heated to a temperature of about 60° to about 120° C. The total duration of this cycle is about 2 to about 6 seconds.

A container (22) whose body (23) has its final shape and dimensions is collected at the outlet of the second molding station (18). In the embodiment in which container (22) has a hemispherical bottom (as is the case for the bottle represented in the Figures), the container is next transported by conveyor (24) to a final finishing station to receive a flat-bottomed base (25) conferring the stability required in the vertical position on the final container (26) (see FIG. 5).

Figure 2:
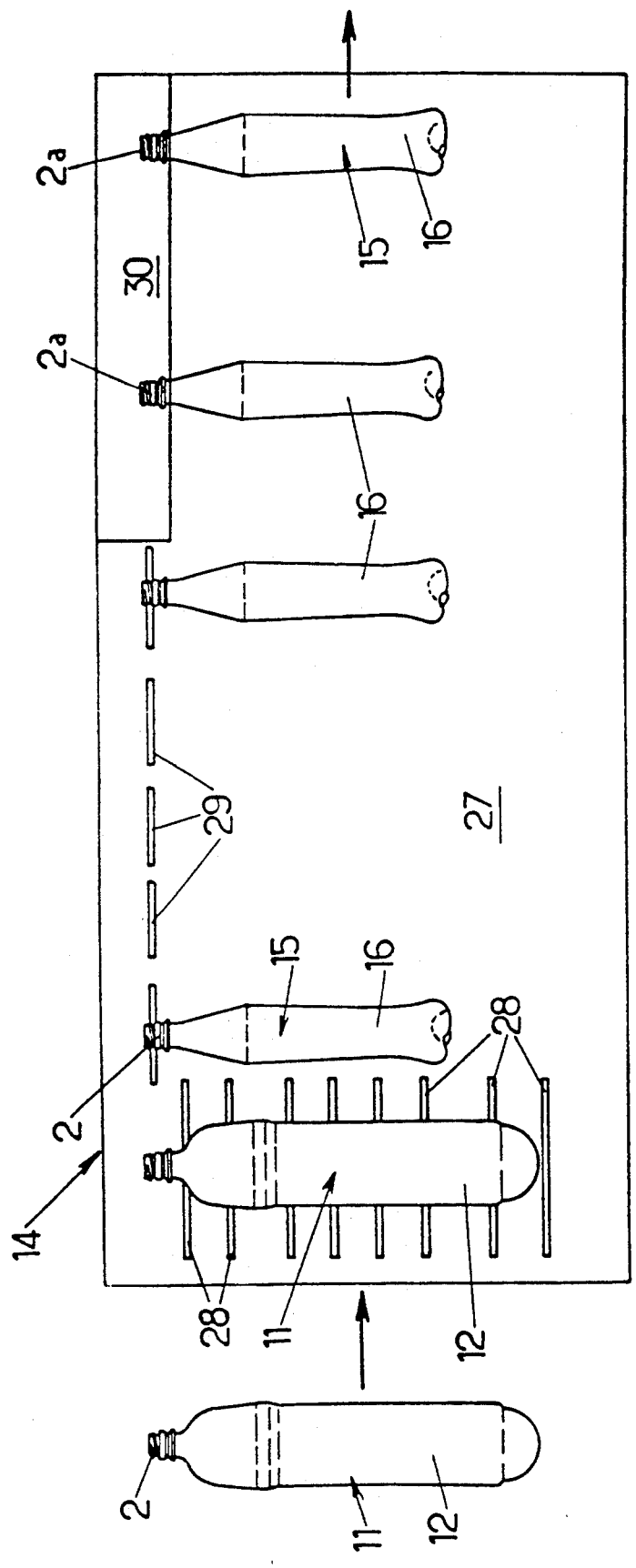
FIGS. 2, 3, and 4 are schematic illustrations of three possible embodiments, respectively, of one of the stations 14 of the installation shown in FIG. 1B.
Figure 3:
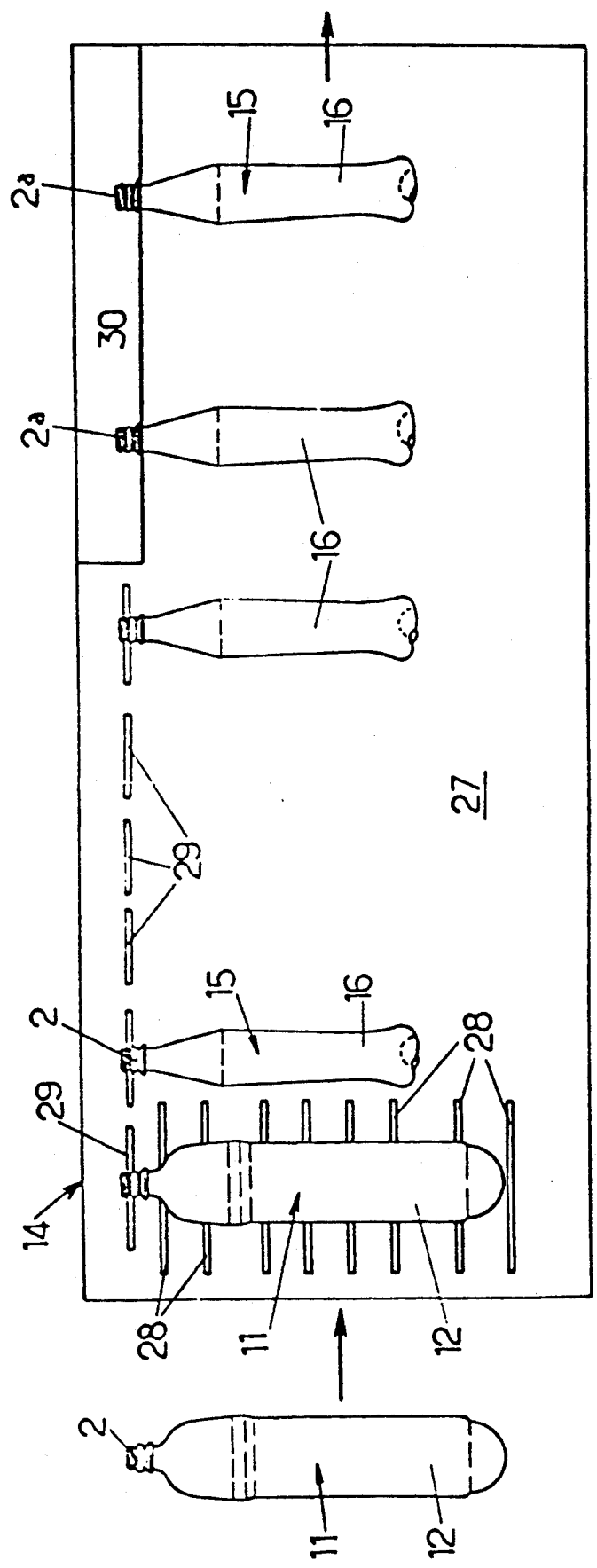
Figure 4:
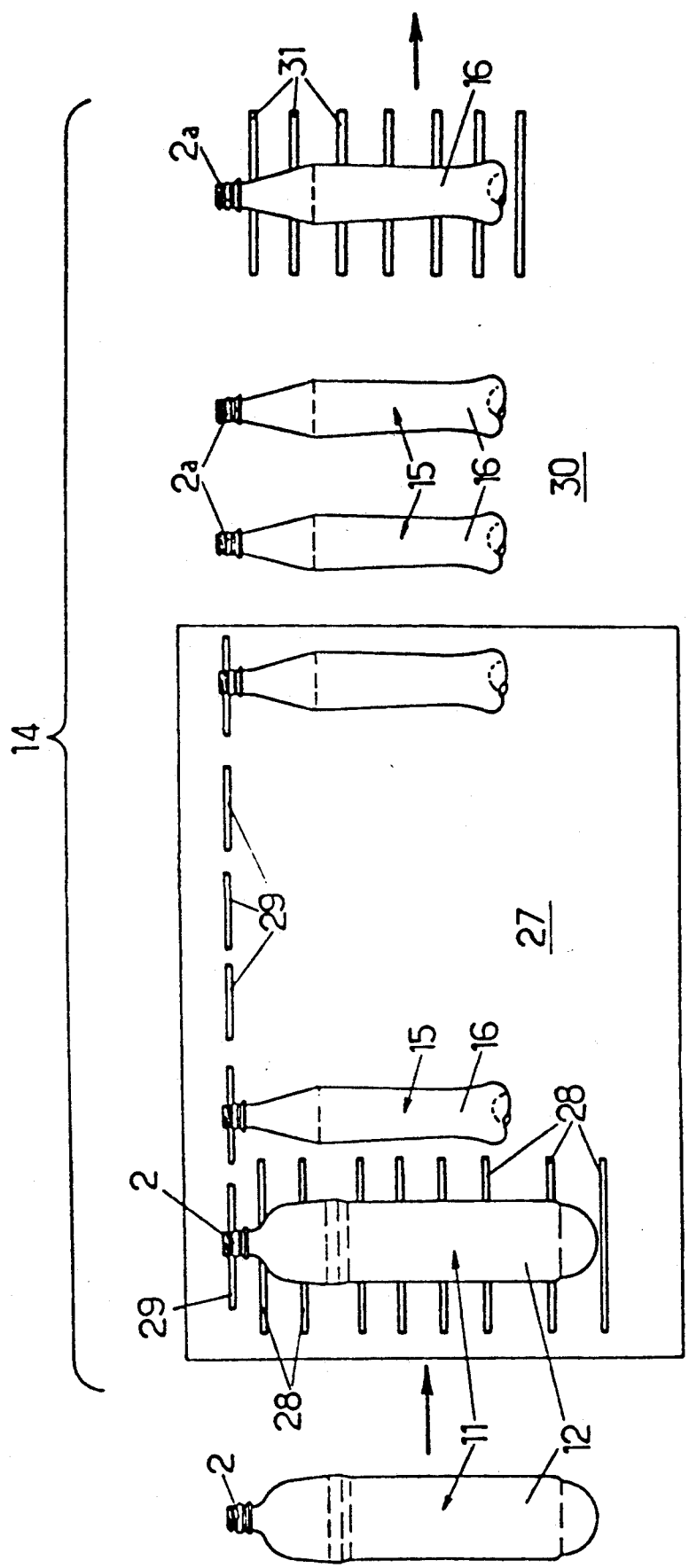

With reference to FIGS. 2 to 4, a more detailed description of the function and structural examples of treatment station (14) will now be provided. Treatment station (14) is designed to ensure simultaneous heating of the body (12) of the oversized intermediate container (11) to prepare for the second subsequent stretching-blowing step and the heating and controlled cooling of the neck (2), so that the PET comprising the neck alone becomes crystallized.

In a first embodiment illustrated in FIG. 2, the intermediate container (11) is placed in an oven (27) where it undergoes horizontal movement of translation while being moved rotationally around its vertical axis where the ambient temperature of the oven is about 160° to about 240° C., preferably about 200° C.

The intermediate container (11) passes in front of a first unit of infrared radiation lamps (28) which are arranged so as to heat only the body (12) of the container. Under the effect of this heating, the stresses induced during the prior biaxial stretching step, effected in order to shape the body (12) of the intermediate container, are relaxed, and the body contracts (16). In addition, the effect produced by this heating is to increase the crystallinity of the PET comprising the container body.

The duration of the heating is a function of the material, the orientation of the intermediate container, and the thickness of its wall. As an example, for an intermediate container having a volume of approximately two liters and a weight of 50 grams, a heating period of 30 seconds makes it possible to obtain a crystallinity of 40–45% in the walls of the body and in the bottom.

As soon as the intermediate container has contracted under the effect of the heat where the duration of the thermal treatment is about 3 to about 30 seconds, preferably about 5 seconds, spherulitic crystallization of the neck (2) of this container is undertaken. Up until this point, the neck had been composed of amorphous PET.

To accomplish this, the neck is heated from the inside and from the outside. Internal heating is effected by a heating mandrel (not shown) inserted in the neck, whose temperature is kept between about 110° and about 200° C., preferably about 140° C. External heating is effected by infrared radiation lamps (29) and by the ambient temperature in the oven (27).

The duration of the neck crystallization treatment is a function of material and thickness. As an example, this duration is approximately 45 seconds for a standardized 28 MCA neck (2), and the ratio of crystalline formation obtained is approximately 35%.

After the neck has been heated, it is kept (at point 30) in an environment whose temperature ranges between about 50° and about 100° C. for about 5 to about 30 seconds, preferably about 20 seconds, and then cooled by a pulsed air current, for example, having a temperature of between about 20° and about 40° C. For a 28 MCA neck (2), the time during which the neck is kept in the environment of between about 50° and about 100° C. is about 20 seconds, and the cooling time (using pulsed air) is between about 20 and about 40 seconds.

During this time, the contracted body (16) of the intermediate container (15) is kept in the oven (27) at a temperature of between about 160° and about 240° C. If necessary, the body may be reheated using infrared radiation lamps before being removed from the oven.

Finally, the intermediate container (15) whose contracted body (16) is hot and whose neck (2a) is crystalized is removed from the oven (27) and sent to the second molding station (18) where it is stretched and blown as described above, thus giving it its final shape.

In a second embodiment of the implementation illustrated in FIG. 3 (which repeats the numerical references appearing in FIG. 2), heating of the body (12) by means of infrared radiation for the purpose of rapid contraction, as well as heating of the neck from the interior and exterior for the purpose of crystallization, begin simultaneously, while the conduct of the remainder of the process, and in particular the temperature and time conditions, remain identical to what has been indicated for the first embodiment.

In a third embodiment of the implementation illustrated in FIG. 4 (which repeats the numerical references appearing in FIG. 2), the procedure begins by heating the body (12) and the neck (2) of the intermediate container in an oven (27), either by effecting a time-lag between the two heating operations, as in the first embodiment, or simultaneously under the same time and temperature conditions. The entire intermediate container (15) having a contracted body (16) is then subjected to controlled cooling at (30), which produces the crystallization of the PET of the neck alone (2a). This cooling lasts from about 10 to about 60 seconds, preferably about 40 seconds.

The intermediate container (15) is then transported to a third heating device (31), which performs a new, rapid heating operation lasting between about 3 and about 30 seconds, preferably about 5 seconds of the contracted body (16) alone, in order to place it under the temperature conditions required for the second stretching-blowing step.

For the same purpose, heating of the entire intermediate container (15) may be carried out optionally by means of infrared radiation for a brief period (about 5 seconds). The time will not be sufficient to appreciably heat the crystallized neck (2a), because of the marked thickness of its wall, while the thinner wall of the contracted body (16) will be rapidly heated to the temperature required for stretching-blowing.

As is obvious and as the foregoing makes clear, the invention is in no way limited to the modes of application and the embodiments which have been specifically contemplated. The invention encompasses all possible embodiments.

What is claimed is:

1. Equipment for manufacturing a PET container capable of withstanding, without appreciable deformation, relatively severe thermal conditions encountered during processing by filling with a hot liquid or pasteurization of the contents of the container, comprising:
   (a) a first mold with means to shape the body of an intermediate container from the body of an amorphous PET preform, wherein the first mold has a molding cavity whose dimensions are larger than the dimensions of the final container to be obtained by about 20% with respect to height and from 0 to about 30% transversely, and comprising means for cooling the walls of the cavity to a temperature of about 5° to about 40° C.;
   (b) a treatment station comprising a first heating device with means to simultaneously heat the body and the neck section of the intermediate container to a temperature of about 160° to about 240° C. to rapidly shrink the body of the intermediate container and to effect crystallization of the neck section and increase the crystallinity of the contracted intermediate container body, means to slowly cool the contracted intermediate container body and the neck section, and a second heating device with means to heat the contracted intermediate container prior to placing it in a second mold; and
   (c) a said second mold with means to shape the body of the final container from the heated body of the intermediate container, wherein the second mold has a molding cavity with dimensions that match the body of the final container and being fitted with means enabling the walls of the cavity to be kept at a predetermined temperature.

2. Equipment according to claim 1, wherein the second heating device is arranged to heat only the body of the intermediate container.

3. Equipment according to claim 1, wherein the second heating device is arranged to heat the entire intermediate container, both body and neck section, and is equipped with heating elements which emit infrared radiation which substantially heat only the body.

4. Equipment according to claim 1, wherein the equipment further comprises, prior to the first mold, a preliminary heating device for heating, to a temperature at least equal to the PET-softening temperature, only the body, exclusive of the neck section, of the amorphous PET preform wherein the neck section of the preform already possesses the final shape and dimensions of the PET container to be formed, and wherein the device is provided with means to provide thermal protection for the neck section, in order to prevent it from being heated.

5. Equipment according to claim 4, wherein the preliminary heating device comprises a succession of infrared ovens arranged as a corridor or tunnel.

6. Equipment according to claim 1, wherein the first mold is part of a first molding station comprising individual molds arranged in a carousel.

7. Equipment according to claim 1, wherein the equipment further comprises a movable mandrel for use at the first mold and the second mold to effect axial elongation of the body of the preform or the body of the intermediate container.

8. Equipment according to claim 1, wherein the equipment further comprises a final finishing station to impart a flat-bottomed base to the final container.

9. Equipment according to claim 1, wherein the first heating device comprises a means to provide horizontal movement of translation for the intermediate container and rotational movement of the intermediate container around its vertical axis.

10. Equipment according to claim 1, wherein the first heating device comprises a first unit of infrared radiation lamps and a heating mandrel for insertion into the neck.

* * * * *